Patented July 2, 1940

2,206,357

UNITED STATES PATENT OFFICE 2,206,357

PRODUCTION OF CASEIN

Theodoor Koch, Oosterbeek, Netherlands, assignor to American Enka Corporation, Enka, N. C., a firm No Drawing. Application September 7, 1937, Serial No. 162,827. In Germany September 10, 1936

4 Claims. (Cl. 260—119)

This invention relates to the production of casein and has particular reference to the production of casein which is suitable for the manufacture of artificial threads.

It is known that when skimmed milk is to be used for the production of casein the separation of the cream from the milk should not be carried out at a temperature exceeding 50° C. if it is desired to obtain a granular casein which can be readily removed by filtration from the skimmed milk. The best results are obtained when the cream is removed from the milk at a temperature of about 36.5° C., the separation of the casein taking place at about 34.5° C. in the presence of such an amount of acid as to give a hydrogen ion concentration of pH=4.6. It has been found, however, that a casein produced even under such carefully controlled conditions is not entirely satisfactory when the casein is to be used in the manufacture of artificial threads. The casein is in particular too variable in the presence of alkali and the viscosity of the solution decreases considerably with the passage of time.

It was now found that alkaline casein solutions which are much more stable can be obtained if the casein separated from skimmed milk at a pH, e. g., of 4.6 is subsequently heated while still in the moist condition for some time at a temperature varying between 50° and 100° C.

The present invention accordingly comprises a process for the production of casein which is suitable for the manufacture of artificial threads which process includes the step of heating the casein precipitated from skimmed milk at a temperature below 50° C. while still in the moist condition, the temperature of heating being preferably between 50° and 100° C.

The heating of the casein may be carried out in a closed container by means of steam or the casein may be suspended in water.

The duration of heating may vary between one and five hours and the best results are obtained when the temperature to which the casein is heated lies between 70° and 90° C.

If the heating takes place while the casein is under water, this water may be either neutral, weakly acid or weakly alkaline. It has, however, been found that the best results are obtained when the hydrogen ion concentration is brought to and maintained at a pH value of approximately 4.6 which is the accepted isoelectric point of casein. (See Casein and Its Industrial Application, by Sutermeister and Browne, 2nd edition, published 1939, page 19; also Hackh's Chemical Dictionary, 2nd edition.)

Casein which has been subjected to a heating process as described above yields solutions in alkali which are of higher viscosity. The most important however, is that the viscosity is more stable and shows less tendency to decrease than casein which has not been so treated.

Artificial threads and like products obtained from such casein solutions also possess better physical properties. The spinning may be carried out in precipitating baths of known composition and such acid spinning baths and in particular those containing salts may be improved by the addition of substances which have a tanning effect on the freshly produced artificial product.

Example

Cows' milk is skimmed at a temperature of 36.5° C. A further increase of temperature, in particular above 50° C. is avoided. Diluted hydrochloric acid is added to the skimmed milk, the temperature of which has been reduced to 34.5° C. until the liquid has a hydrogen ion concentration corresponding to a pH value of 4.6. The casein which is precipitated in a granular form is filtered off, washed and then suspended in three times its weight of water. The hydrogen ion concentration of this suspension is increased by the addition of hydrochloric acid until a pH value of 4.6 is attained. The mixture is maintained at 85° C. for two hours and is then cooled to room temperature. The casein is filtered off, washed and centrifuged for the removal of excess liquid therefrom and is then dissolved in ammonia to form a casein solution containing 17% casein.

This casein solution may be spun in a spinning bath consisting of 20% zinc sulphate, 1% sulphuric acid and 5% of the neutralized condensation product obtained by the action of half mol formaldehyde on one mol cresyl sulphonic acid.

What I claim is:

1. A process for the production of substantially stable casein solutions having a constant viscosity which comprises precipitating casein in the presence of an acid solution having a pH value of approximately 4.6 and at a temperature below 50° C. to form a granular product, and then heating the product between 50° C. and 100° C., while maintaining the said pH value, filtering, washing and dissolving the casein in an alkaline solution which upon extrusion into a coagulating bath will form threads and the like.

2. A process for the production of substantially stable casein solutions having a constant viscosity, which comprises precipitating casein at its isoelectric point in the presence of an acid solution, and at a temperature below 50° C. to form a granular point, and then heating the product between 50° C. and 100° C. for a period of from one to five hours, while maintaining the product at its isoelectric point, filtering, washing and dissolving the casein in an alkaline solution which upon extrusion into a coagulating bath will form threads and the like.

3. A process for the production of substantially stable casein solutions having a constant viscosity, which comprises precipitating casein at its isoelectric point in the presence of an acid solution, and at a temperature below 50° C. to form a granular point, and then heating the product between 70° C. and 90° C. for a period of from one to five hours, while maintaining the product at its isoelectric point, filtering, washing and dissolving the casein in an alkaline solution which upon extrusion into a coagulating bath will form threads and the like.

4. A process for the production of substantially stable casein solutions, the viscosity of which does not decrease, which comprises precipitating casein in granular form from skimmed milk in the presence of hydrochloric acid, the said mixture having a temperature of approximately 34.5° C. and maintained at a pH value of 4.6, filtering and washing the granular casein and suspending the same in an aqueous medium, readjusting the pH value to 4.6 and heating the mixture to approximately 85° C. for a period of from 1 to 5 hours, refiltering and rewashing the casein and dissolving the same in an ammonical solution to form a stable casein solution suitable for the manufacture of threads and the like, said solution containing approximately 17% casein.

THEODOOR KOCH.